July 3, 1962

T. M. HOLLOWAY 3,042,062

PRESSURE SELECTOR

Filed June 25, 1959

INVENTOR
Thomas M. Holloway

BY Dodge and Sons
ATTORNEYS

United States Patent Office 3,042,062
Patented July 3, 1962

3,042,062
PRESSURE SELECTOR
Thomas M. Holloway, Waukesha, Wis., assignor to Johnson Service Company, Milwaukee, Wis., a corporation of Wisconsin
Filed June 25, 1959, Ser. No. 822,777
2 Claims. (Cl. 137—112)

This invention relates to high pressure selectors, that is, devices which selectively transmit to an outlet passage the higher of two inlet pressures.

Devices of this type are in use today in automatic temperature controllers for air conditioning systems. In general, these selectors include a housing containing a chamber which is divided into a pair of sub-chambers by a flexible diaphragm that extends through the chamber and is clamped in place around the outer periphery of the chamber. Each sub-chamber is in continuous communication with an inlet port and flow from these sub-chambers to a common outlet port is controlled by a pair of valves which are actuated in reverse senses by the diaphragm as it moves in opposite directions from its mid position. The parts are so arranged that when the diaphragm is in its mid position, both valves are open.

In all known prior art devices, the areas of the opposite sides of the diaphragm, that are subject to the inlet pressures, are always substantially equal, and, therefore, the speed at which the diaphragm moves depends upon the rate of change of the pressure differential between the two sub-chambers. When the rate of change of pressure differential is low, the time required for the diaphragm to pass through its mid position, and consequently the time interval during which both valves are open, is relatively long. In those cases where the inlet pressures are controlled by closed loop circuits or self-lapping relays (such as the one shown in the patent to Otto et al., 1,500,260, July 8, 1924), this condition is not serious because flow into or out of each inlet connection through the selector does not change the pressure in that connection. However, in those installations employing open loop pressure control circuits (see, for example, the "day" control circuit in Otto Patent 2,193,295, March 12, 1940), interconnection between the two sub-chambers in the selector can cause the pressures in these sub-chambers to equalize. Once this happens, further changes in the magnitude of either inlet pressure are ineffective to shift the diaphragm and the selector becomes inoperative. Because of this, prior art selectors which are supplied by open loop pressure control circuits are limited to use in environments where the rates of change of pressure differential between the two sub-chambers are relatively high.

The object of this invention is to provide a high pressure selector which is capable of operating reliably in environments where the rates of change of differential between the two inlet pressures are low even though the inlet pressures are not controlled by self-lapping relays. According to the invention, the fixed and movable elements of the two valves are so formed that they engage along a line that divides the associated sub-chamber into a central space and an encircling annular space; the spaces in each sub-chamber being in communication with each other when the associated valve is open and being isolated from each other when that valve is closed. Corresponding spaces in the two sub-chambers are in restricted communication with a common outlet passage and the other spaces are connected with two separate inlet ports. The cross-sectional areas of those spaces which are in communication with the outlet passage constitute substantial portions of the cross-sectional areas of the two sub-chambers.

The selector employs a slack diaphragm so that even when the pressure forces acting on the diaphragm are equal, it maintains one of the valves closed. With this arrangement, the higher of the two inlet pressures acts on the entire surface of one side of the diaphragm and on that portion of the opposite side of the diaphragm that overlies the space which is connected with the common outlet passage. When the pressure relationship between the two inlet passages is reversed, the pressure differential acting across that portion of the diaphragm overlying the spaces connected with the two inlet passages deflects the diaphragm and opens the valve which heretofore had been closed. This action permits the now higher inlet pressure to act over the entire surface of one side of the diaphragm and thus increases greatly the shifting force acting on the diaphragm. The significant change in diaphragm area subject to the higher pressure at the time the diaphragm commences to shift, produces "snap action" which ensures that the diaphragm shifts rapidly and closes the valve in the sub-chamber subject to the lower pressure even though the rate of change of pressure differential is low.

The preferred embodiment of the invention will now be described in detail with reference to the accompanying drawing, in which.

Figure 1:
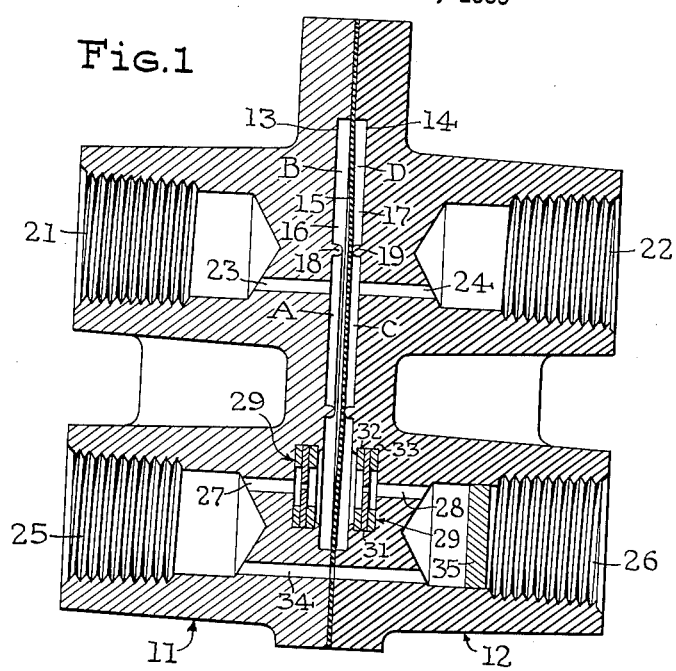
FIG. 1 is an axial sectional view of one improved high pressure selector in which the inlet ports communicate with the central spaces in the two sub-chambers.

As shown in FIG. 1, the selector comprises a housing having two identical sections 11 and 12 which are joined by bolts (not shown) and whose mating faces contain shallow circular bores 13 and 14. Clamped between the mating faces of the sections 11 and 12 is a flexible slack or fabric diaphragm 15 which divides the chamber defined by bores 13 and 14 into sub-chambers 16 and 17. A circular rib 18, formed as an integral part of housing section 11, projects into sub-chamber 16 and divides it into a central space A and an encircling annular space B. A similar rib 19 divides sub-chamber 17 into corresponding spaces C and D. The ribs 18 and 19 are the fixed elements of two valves whose movable elements are defined by the opposite sides of diaphragm 15. These valves control communication between spaces A and B and C and D, respectively. The ribs 18 and 19 are narrow relative to the diameter of spaces A and C and their edges are rounded so that when each valve is closed its fixed and movable elements are in line contact. It is important that the area of contact between the fixed and movable valve elements be small relative to the cross-sectional areas of central spaces A and C because when a valve opens under the action of the pressure in the associated central space and fluid flows through the small gap created between the diaphragm and the rib, it experiences an increase in velocity and a decrease in pressure. This reduced pressure acts on the contact area of the valve elements and tends to retard movement of the diaphragm. If the contact area is large, the diaphragm may not move far enough to close the valve in the low pressure sub-chamber.

The central spaces A and C are connected with the inlet ports 21 and 22 by passages 23 and 24, respectively, and the spaces B and D are connected with the outlet ports 25 and 26 by passages 27 and 28, respectively. Each of the passages 27 and 28 is provided with a flow restrictor 29 which comprises an orifice plate 31, a thin gasket 32 and a reinforcing ring 33. The three parts of each restrictor 29 are held in place by staking. The two outlet ports 25 and 26 are interconnected by a passage 34 and one of the ports, port 26, is closed and sealed by a plug 35.

During operation, the inlet ports 21 and 22 are connected with the two sources of pressure fluid and the unplugged outlet port, port 25, is connected with the system to which the higher of the two inlet pressures is to be transmitted. When the pressure in inlet port 21 is higher than the pressure in inlet port 22, the diaphragm shifts to the position shown in FIG. 1 thereby establishing communication between spaces A and B across rib 18 and interrupting communication between spaces C and D across rib 19. In this position of the diaphragm, outlet port 25 and spaces A, B and D are in communication with inlet port 21 so they are subjected to the higher of the two inlet pressures. Because of this, the pressures acting on opposite sides of diaphragm 15 are balanced except in the region of central spaces A and C.

Since diaphragm 15 is a slack diaphragm, it remains in the FIG. 1 position as long as the pressure in inlet port 22 and space C is less than or equal to the pressure in space A. However, when the pressure in space C rises above the pressure in space A, the pressure differential across the diaphragm, in the region of these spaces, will shift it to the left away from rib 19 and toward rib 18. As the diaphragm 15 moves, it opens communication between spaces C and D and, because of the presence of restrictor 29 in passage 28, the pressure in space D builds up quickly to the pressure in space C. When this happens, that portion of the diaphragm 15 overlying space D is subjected to the higher of the two inlet pressures and therefore the entire area of the diaphragm is exposed to the differential between the two inlet pressures. This significant increase in the area of the diaphragm subject to the pressure differential causes the diaphragm to move rapidly toward and into engagement with rib 18. Once communication between spaces A and B is interrupted, the pressures in outlet port 25 and spaces B, C and D will become equal to the pressure in inlet port 22.

If the pressure in inlet port 21 should again become greater than the pressure in port 22, the same "snap action" will move diaphragm 15 back into engagement with rib 19.

In addition to "snap action," another advantage afforded by this invention is the fact that at no time is the unplugged outlet port isolated from both inlet ports. In some prior art devices, such isolation of the outlet port occurs whenever the two inlet pressures are equal. Since, in some cases, equality of the two inlet pressures may exist for a considerable period of time, leakage from the system supplied by the selector can cause a drastic reduction in outlet pressure. This disadvantage is eliminated in each embodiment of the present invention.

Figure 2:
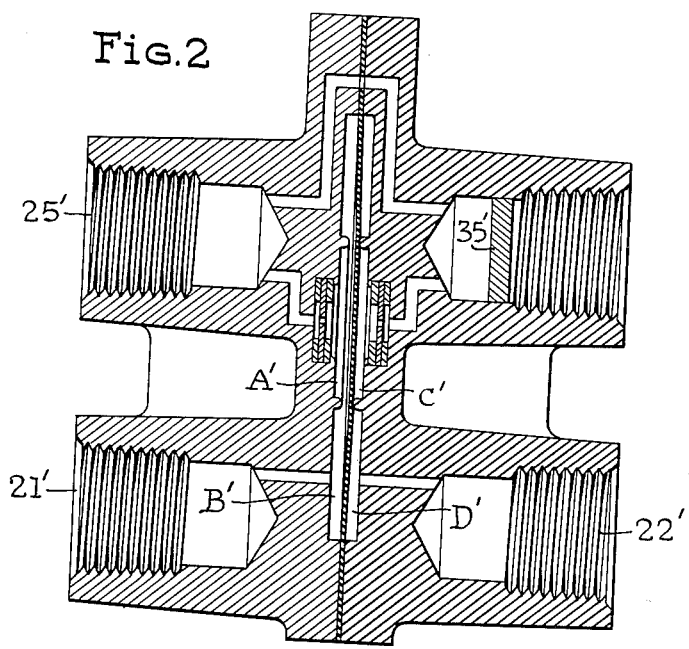
FIG. 2 is an axial sectional view of another improved high pressure selector in which the inlet ports communicate with the encircling annular spaces in the two sub-chambers.

The FIG. 2 embodiment is the same as FIG. 1 except that the inlet and outlet ports are reversed, i.e., the inlet ports 21' and 22' communicate with the annular spaces (B' and D' in this embodiment) and the unplugged outlet port 25' communicates with the central spaces (A' and C'). In this arrangement, the additional areas which produce the "snap action" are the cross-sectional areas of the central spaces A' and C'. Except for this difference, the two embodiments operate in the same manner.

As stated previously, the drawings and description relate only to the preferred embodiment of the invention. Since many changes can be made in the structure of this embodiment without departing from the inventive concept, the following claims should provide the sole measure of the scope of the invention.

What is claimed is:

1. A pressure selector comprising a housing containing a chamber; a diaphragm extending through the chamber, said diaphragm being clamped around the outer periphery of the chamber and being slack in the entire unclamped portion thereof, said diaphragm dividing the chamber into first and second sub-chambers; valves, one located in each sub-chamber and each comprising a fixed element carried by the housing and a movable element carried by the diaphragm, the valves being opened and closed in reverse senses by movement of the diaphragm in opposite directions, the elements of each valve being arranged to contact each other along a line which divides the associated sub-chamber into a central space and an encircling annular space, the spaces in each sub-chamber being in communication with each other when the associated valve is open and being isolated from each other when that valve is closed; a first inlet port communicating with one of the two spaces in the first sub-chamber and a second inlet port communicating with the corresponding space in the second sub-chamber; a common outlet passage; and restricted interconnecting passages connecting the other spaces in the sub-chambers with the common outlet passage, the cross-sectional areas of the other spaces constituting substantial portions of the total cross-sectional areas of the sub-chambers, whereby as the diaphragm moves toward the sub-chamber containing the lower inlet pressure there is a significant increase in the area of the diaphragm subject to the higher inlet pressure.

2. The pressure selector defined in claim 1 in which the fixed element of each valve comprises an annular rib projecting into the sub-chamber; and in which the opposite sides of the diaphragm serve as the movable valve elements.

References Cited in the file of this patent

UNITED STATES PATENTS

| | | |
|---|---|---|
| 2,262,823 | Stearns | Nov. 18, 1941 |
| 2,379,692 | Dodson | July 3, 1945 |
| 2,603,231 | Birkemeier | July 15, 1952 |
| 2,778,373 | Jaquith | Jan. 22, 1957 |
| 2,817,356 | Glass | Dec. 24, 1957 |

FOREIGN PATENTS

| | | |
|---|---|---|
| 539,895 | Great Britain | Sept. 29, 1941 |